(12) United States Patent
Perret

(10) Patent No.: US 6,267,348 B1
(45) Date of Patent: Jul. 31, 2001

(54) DEVICE FOR MICROMETRIC POSITIONING OF A SPACE OPTICAL SUPPORT ELEMENT ALONG SIX DEGREES OF FREEDOM

(75) Inventor: Lionel Perret, Toulouse (FR)

(73) Assignee: Centre National d'Etudes Spatiales (C.N.E.S.), Paris Cedex (FR)

( * ) Notice: Subject to any disclaimer, the term of this patent is extended or adjusted under 35 U.S.C. 154(b) by 0 days.

(21) Appl. No.: 09/381,683

(22) PCT Filed: Mar. 20, 1998

(86) PCT No.: PCT/FR98/00568

§ 371 Date: Sep. 23, 1999

§ 102(e) Date: Sep. 23, 1999

(87) PCT Pub. No.: WO98/44373

PCT Pub. Date: Oct. 8, 1998

(30) Foreign Application Priority Data

Mar. 28, 1997 (FR) .................................................. 97 04034

(51) Int. Cl.[7] ........................... F16M 1/00; F16M 11/00; F16M 3/00; F16M 5/00; G02B 5/08
(52) U.S. Cl. .......................................... 248/660; 359/849
(58) Field of Search .................................... 248/660, 661, 248/648, 646; 359/849

(56) References Cited

U.S. PATENT DOCUMENTS

| 3,989,358 | 11/1976 | Melmoth . | |
|---|---|---|---|
| 4,226,507 | * 10/1980 | Fuschetto | 359/849 |
| 4,362,363 | * 12/1982 | Mulder et al. | 359/846 |
| 4,540,251 | * 9/1985 | Yau et al. | 359/849 |
| 4,763,991 | 8/1988 | Klotz, Jr. . | |
| 5,181,430 | 1/1993 | Panin . | |
| 5,844,732 | * 12/1998 | Huiban et al. | 359/849 |

FOREIGN PATENT DOCUMENTS

| 2 534 663 | 4/1984 | (EP) . |
| 0 701 157 | 3/1996 | (EP) . |
| 59-033412 | 2/1984 | (JP) . |

OTHER PUBLICATIONS by S. C. West et al., "Optical metrology for two large highly aspheric telescope mirrors", *Applied Optics*, vol. 31, No. 34, Dec. 1992, pp. 7191–7197.

* cited by examiner

*Primary Examiner*—Ramon O. Ramirez
*Assistant Examiner*—J. DeLuca
(74) *Attorney, Agent, or Firm*—Young & Thompson

(57) ABSTRACT

The invention concerns a device for micrometric positioning with respect to a frame (1) of an optical support (2) element (3) integrated in a space system, comprising three turrets (4, 5, 6) integral with the frame (1) and, for each turret first means (9 to 12) for adjustment along a first direction, second means (20 to 22) for adjustment along a second direction, third means (30 to 35) for micrometric adjustment along a third direction, and means for locking the support (2) in adjusted position with respect to the frame (1) comprising at least a lock screw and a shim.

29 Claims, 6 Drawing Sheets

Figure 1:
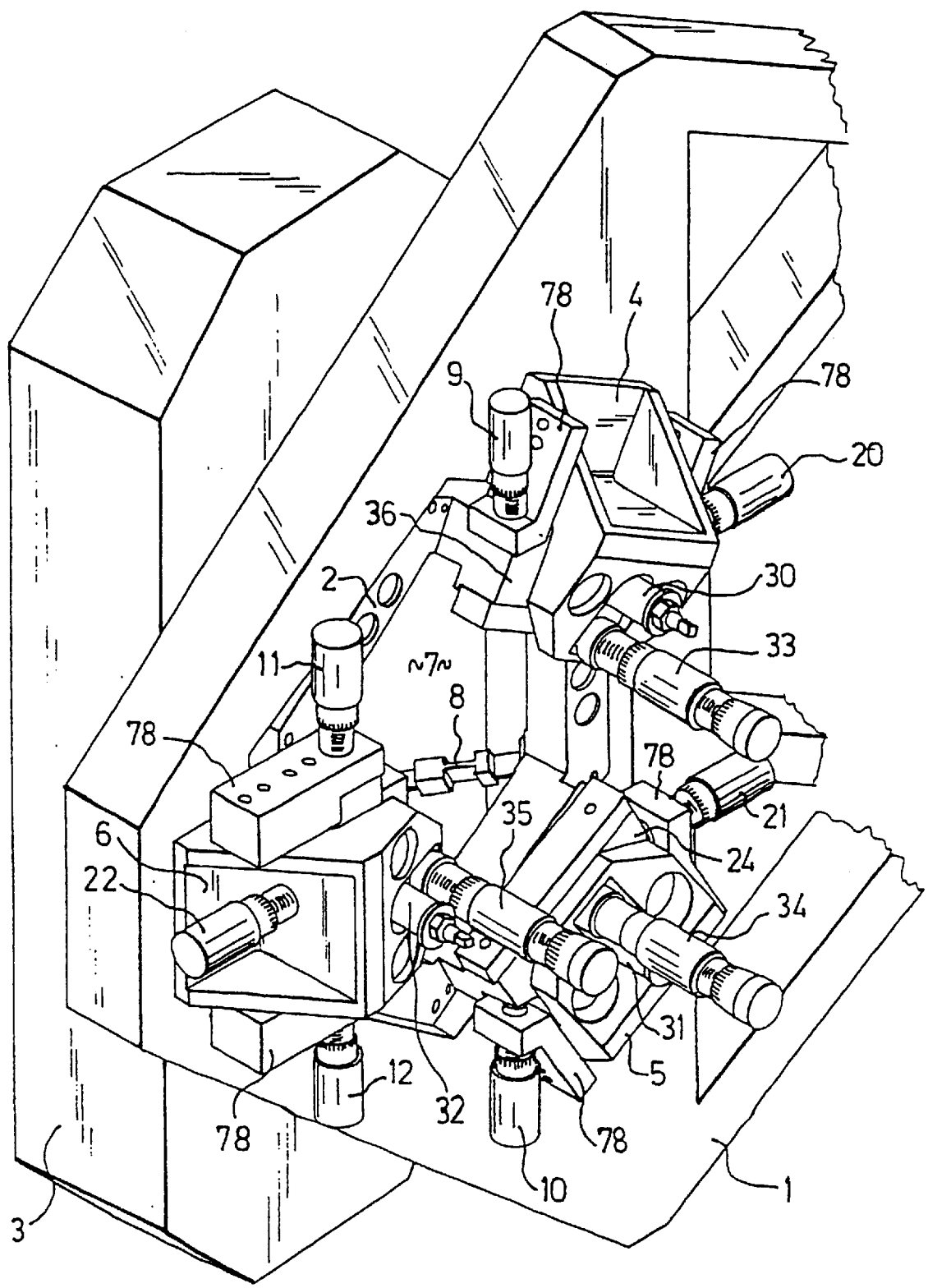

DEVICE FOR MICROMETRIC POSITIONING OF A SPACE OPTICAL SUPPORT ELEMENT ALONG SIX DEGREES OF FREEDOM

The invention concerns a device for the micrometric positioning of a support for an optical element integrated into a space system, namely a system designed to be launched into space, for example an artificial satellite, an orbital station or a planetary probe etc.

Space systems often incorporate optical systems, for example for the reception of images (planetary or astronomical observations), or even sometimes for the emission of rays or light signals etc. Now, the efficiency and precision of these optical systems are closely linked to the correct positioning of the optical elements of which they consist, with respect to a frame secured to the space system.

Certain on-board optical systems include so-called active optical elements which can be adjusted in space from the ground. These systems are sophisticated, heavy and bulky and thus extremely costly and are reserved for special applications (for example astronomical observations) for which mobility and adjustments in operation are imperative.

On the other hand, many optical systems integrated into space systems include so-called passive optical elements, namely those which are adjusted and fixed with respect to the frame on the ground and of which the position may not be adjusted in flight. The problem which such optical systems presents is then that of the precision of the initial adjustment on the ground and the maintenance of this adjustment during take-off phases (during which the system must be able to withstand high accelerations typically of 30 g or more), and then in space in the absence of gravity. Now, although these adjustments may be easily carried out with one, two or three degrees of freedom (for example for the centering of a spherical mirror), or with low precision (above 10 $\mu$m), the problem exists of positioning such an optical element on the ground with a precision of the order of a micron and with six degrees of freedom. This problem in particular exists for the positioning of aspherical mirrors of a planetary observation telescope of which faults in positioning cannot be compensated for by decentering as for telescopes with spherical mirrors, and which must permit very fine resolutions to be obtained.

The invention thus aims at overcoming these disadvantages by providing a device for the micrometric positioning with six degrees of freedom of an optical element with respect to a frame of a space system permitting adjustment on the ground with high precision, locking in position and maintenance in position during take-off and in space, precision being preserved.

The object of the invention is also to obtain this positioning in a simple, low-cost manner with a low weight and a low overall size of the parts integrated into the space system.

The object of the invention is more particularly to provide a micrometric positioning device for the mirrors of a telescope with aspherical mirrors integrated into an earth observation satellite.

To this end, the invention concerns a device for the micrometric positioning, with respect to a frame, of a support for an optical element designed to be integrated into a space system, wherein it comprises three mountings secured to the frame and, for each mounting:

first means of adjustment in translation along a first direction, of a first position of the support with respect to the mounting, second means of adjustment in translation along a second direction, at least substantially orthogonal to the first direction, of a second portion of the support with respect to the mounting, third means of micrometric adjustment in translation along a third direction, at least substantially orthogonal to the first and the second direction, of a third portion of the support with respect to the mounting, these third means of micrometric adjustment including means for the micrometric measurement of the distance separating the third portion of the support and a facing portion of the mounting, the different first, second and third means of adjustment of the different mountings being adapted so as to be able to support and hold the support and the optical element in place with respect to the frame, and to permit adjustment of the position of the support with respect to the frame with six degrees of freedom, means for locking the support in an adjusted position with respect to the frame comprising:

at least one locking screw associated with the support and the mounting via connecting means adapted so as to be compatible with different relative positions and orientations which can be assumed by the support with respect to the mountings, taking into account the accepted ranges for the amplitudes of adjustment for the different means of adjustment of the different mountings, the locking screw and the connecting means being adapted so as to lock, after tightening, the mounting and the support in position with respect to each other, at least one shim of which the thickness is determined as a function of the distance measured between the third portion of the support and the facing portion of the mounting, this shim being placed so as to fill entirely, with the said connecting means, the distance separating the mounting from the support about the locking screw, so that the position of the support with respect to the frame may be adjusted on the ground with a high degree of precision with six degrees of freedom, and then locked with locking screws enabling this adjusted position to be maintained during the launch of the space system and in space.

The possibilities of adjustment along three orthogonal directions at the level of three distinct mountings permit adjustment of the support and the optical element with six degrees of freedom.

Moreover, locking with the aid of a locking screw and with shims of which the thicknesses, determined by a micrometric thickness measurement, enables the optical element to withstand take-off and flight phases without loss of adjustment.

In all the present application, the expression "at least substantially along a direction" encompasses this direction and directions making an angle with this direction of less than or equal to the permitted angular variations for the support with respect to this direction in the accepted ranges for the adjustment amplitudes for the different means of adjustment. It should be noted in this respect that, given that the device permits micrometric positioning, the amplitudes of the adjustments are small, so that the three directions in space may be defined, in an equivalent manner for the general kinematics of the device, either with reference to the support or with reference to the frame. The support is moreover adapted so as to define reference and supporting planes for the means of adjustment which are parallel in a nominal position (corresponding to the position of the support with respect to the frame such as defined theoretically if all the parts and assemblies were perfect) to the reference and supporting planes of the means of adjustment of the frame.

In this way, the said first, second and third directions may be defined and fixed with respect to the frame or with respect to the support. Preferably, these three directions are defined and fixed with respect to the frame.

In addition, the first, second and third directions designate the geometric directions common to the three mountings.

The first, second and third directions are three directions at least substantially orthogonal two-by-two, i.e. they are normally orthogonal two-by-two in a nominal position of the optical element with respect to the frame, but one or more of them may not satisfy, in certain positions, this condition of strict orthogonality in variants where at least one direction is defined and fixed with respect to the support while at least one other direction is defined and fixed with respect to the frame.

Accordingly, the main condition which the three directions and the different means of adjustment must satisfy is to permit relative movements in at least one certain amplitude range, permitting the micrometric positioning of the optical element in its optimum functioning position, with six degrees of freedom.

Advantageously and according to the invention, the third means of micrometric adjustment are adapted so as to permit adjustment with at least three distinct precisions, namely a coarse precision, a medium precision and a fine precision. Advantageously and according to the invention, the fine precision is less than or equal to 1 $\mu$m and the said coarse and medium precisions are of the order of 100 $\mu$m and 10 $\mu$m. respectively.

Advantageously and according to the invention, the third means of micrometric adjustment include a coarse adjustment device adapted so as to permit adjustment to the coarse precision and a distinct fine adjustment device adapted so as to permit adjustment to medium and fine precisions.

Advantageously and according to the invention, the coarse adjustment device has no means for measuring the distance between the third portion of the support and the facing portion of the mounting. These means of measurement can be formed on, or incorporated in, the fine adjustment device, or, as a variant, may be distinct from the coarse and fine adjustment devices, and specifically provided.

Advantageously and according to the invention, the coarse adjustment device comprises:

two elastic return devices adapted so as to exert opposing return forces on a first part which is secured either to the mounting or to the support, a screw/nut system for adjusting the distance between a second part which is secured respectively either to the support (if the first part is secured to the mounting), or to the mounting (if the first part is secured to the support) and a complementary part, one of the elastic return devices pressing on the said complementary part while the other elastic return device presses on this second part. "Secured to" is understood to mean that the part is carried or formed by the mounting or the support.

Advantageously and according to the invention, the return devices work in compression.

Advantageously and according to the invention, the two elastic return devices are cylinders made of an elastic synthetic material in compression and the screw/nut system is adapted so that the two cylinders are in the compressed state in any adjustment position.

Advantageously and according to the invention, the stiffness of each of the elastic return devices is adapted so as to enable the support to be held in position with respect to the frame under the effect of gravity but so as to permit adjustments by action on the first and second means of adjustment and on the fine adjustment device of the third means of micrometric adjustment.

Advantageously and according to the invention, the screw/nut system comprises a rod passing through a bore provided through the said first part, and this bore has an internal diameter greater than the external diameter of the rod so as to permit relative movements and adjustments along the said first and second directions.

Advantageously and according to the invention, washers made of a material with a low static coefficient of friction are interposed from each side of the bore, between each end of the elastic return devices, and an opposite supporting face of the first part, so as to facilitate relative movements along the first and second directions under the effect of the first and second means of adjustment.

Advantageously and according to the invention, the fine adjustment device is adapted so as to push back the said first and second parts against the elastic return devices of the coarse adjustment device.

Advantageously and according to the invention, the fine adjustment device includes means for the micrometric measurement of the distance separating the third portion of the support and the facing portion of the mounting, with two distinct sensitivities, namely a medium sensitivity and a fine sensitivity. Advantageously and according to the invention, the medium and fine sensitivities correspond to the said medium and fine precisions, and are in particular respectively of the order of 10 $\mu$m and less than or equal to 1 $\mu$m.

Advantageously and according to the invention, the fine adjustment device includes a body carried by the mounting and a rod which can move along the third direction and of which the free end comes into contact pressing on the bearing surface of the third portion of the support. Advantageously and according to the invention, the fine adjustment device consists of a differential micrometric stop. Advantageously and according to the invention, this differential micrometric stop comprises a movable rod of which the free end presses against a bearing surface and this bearing surface is, at least in the nominal position, perpendicular to the axial direction of movement of the movable rod of this stop.

Advantageously and according to the invention, each locking screw extends at least substantially along the said third direction.

In addition, advantageously and according to the invention, the connecting means comprise, for each locking screw, two pairs of washers with spherical contacting bearing surfaces, these pairs of washers pressing respectively against bearing surfaces oriented in opposite directions so as to enable the locking screw to be tightened with different orientations relative to the support and to the mounting. As a variant and according to the invention, the means of adjustment include, for each locking screw, a ball coupling.

Advantageously and according to the invention, the device is characterized in that, for each locking screw, the support includes a tapping for receiving an end of the locking screw, and the mounting includes a bearing surface for supporting a head of the locking screw, and a bore traversed by the locking screw, and in that the internal diameter of the bore is greater than the external diameter of the locking screw by an amount sufficient to enable the locking screw to be tightened in the tapping in any position of the support with respect to the frame adjusted along the first and second directions, within the extent of the adjustment traverses provided.

Advantageously and according to the invention, the connecting means include a pair of washers with spherical contacting bearing surfaces interposed between the head of the locking screw and the bearing surface of the mounting, and a pair of washers with spherical contacting bearing surfaces placed around the locking screw between the mounting and the support. More particularly, advantageously and according to the invention, a pair of washers with spherical contacting bearing surfaces come into contact with a bearing surface of the mounting oriented towards the support. Advantageously and according to the invention, the shim is a washer interposed between this pair of washers with spherical contacting bearing surfaces, which comes into contact with a bearing surface of the mounting and a bearing surface of the third portion of the support.

In addition, advantageously and according to the invention, the first means of adjustment and/or the second means of adjustment include a micrometric stop carried by the mounting or by the support, this micrometric stop having a rod of which the free end comes into contact with a facing bearing surface of the support or of the mounting respectively. Advantageously, each bearing surface is, at least in the nominal position, perpendicular to the axial direction of movement of the rod of the stop.

Preferably and according to the invention, the micrometric stops of the first, second and third means of adjustment are carried by the mountings, and their movable rod presses against the facing bearing surfaces of the support.

Advantageously and according to the invention, the three mountings extend overall in the same plane at least substantially perpendicular to the said third direction, the means of adjustment along the first and second directions being means for centering the optical element with respect to the mountings. The three mountings are preferably positioned following a relative angular distribution as closely as possible (taking into account the other constraints of the device and of the optical system, in particular of the shape of the optical element) to a distribution of 120 degrees to each other about an axis at least substantially parallel to the third direction.

Advantageously and according to the invention, the different means of adjustment have parts adapted so as to be detachable and dissociated from the frame and/or the support after locking in the adjusted position. In particular, advantageously and according to the invention, the elastic return devices and the screw/nut system of the coarse adjustment device of the third means of micrometric adjustment and the different micrometric stops are mounted so as to be detachable after locking in the adjusted position.

Advantageously and according to the invention, the means of locking are dimensioned so as to be able to withstand a maximum acceleration of between 15 g and 60 g in any direction without the adjustment changing.

The invention also extends to a device wherein it comprises in combination all or part of the characteristics mentioned above or hereinafter.

The invention also concerns more particularly the application of a device according to the invention for the micrometric positioning of an aspherical mirror of a telescope for observing the earth from space. The invention nevertheless also permits the micrometric positioning of any other optical element in a similar manner (detector, light source, lens etc) for other optical systems (interferometer etc) or other space systems (planetary probes, astronomical observation satellites, orbital stations etc).

Figure 2:
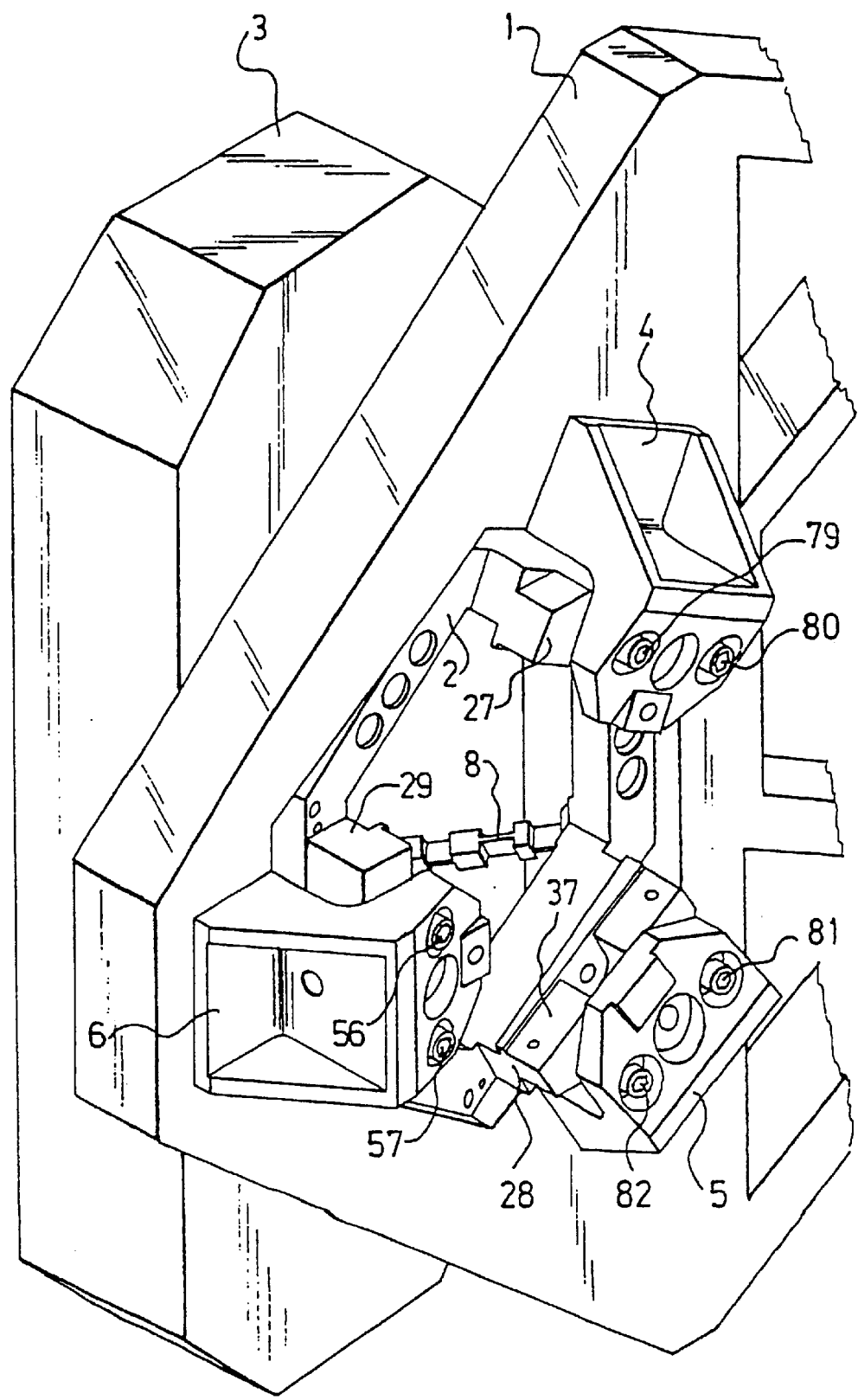
Figure 3:
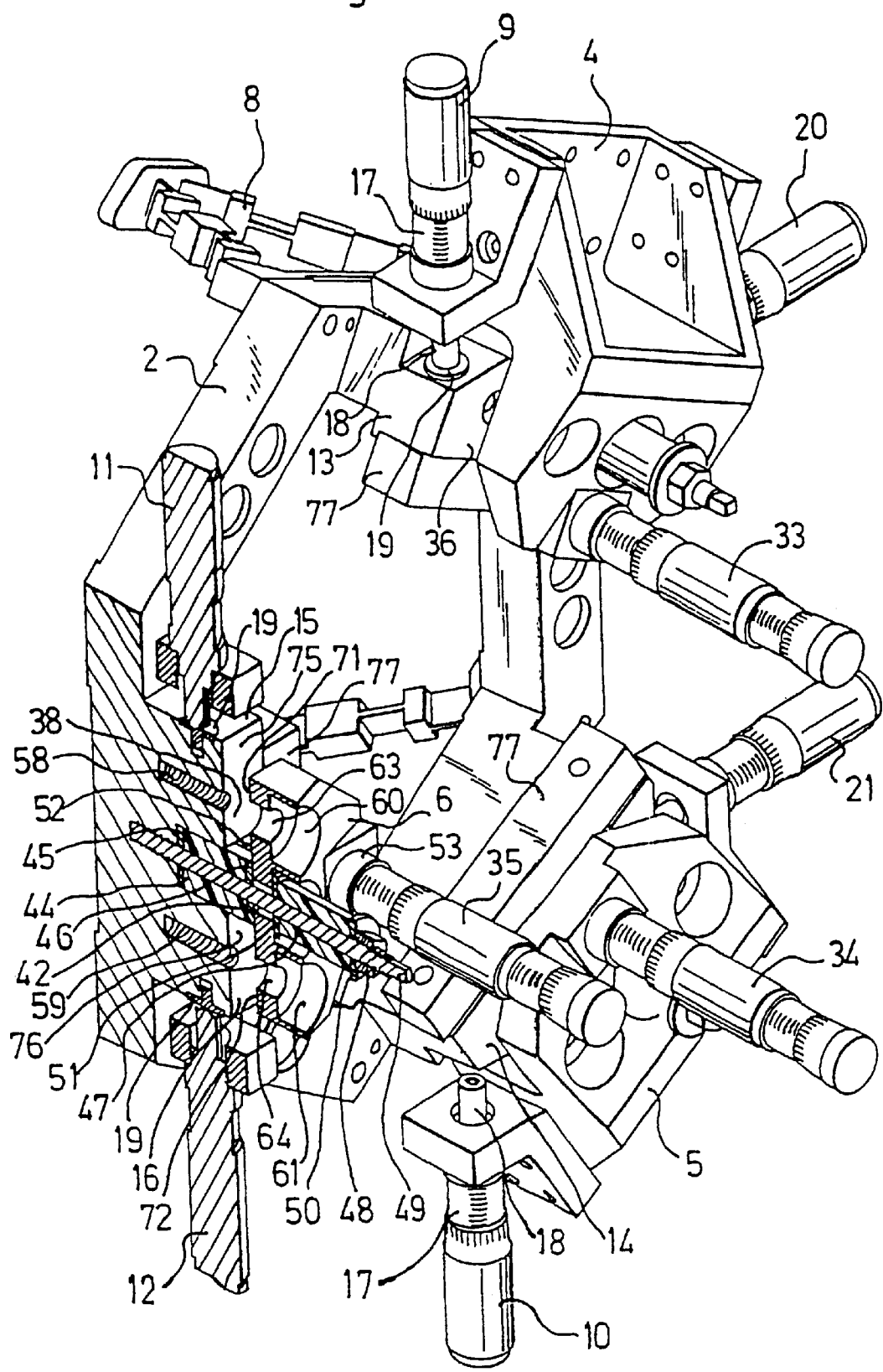
Figure 4:
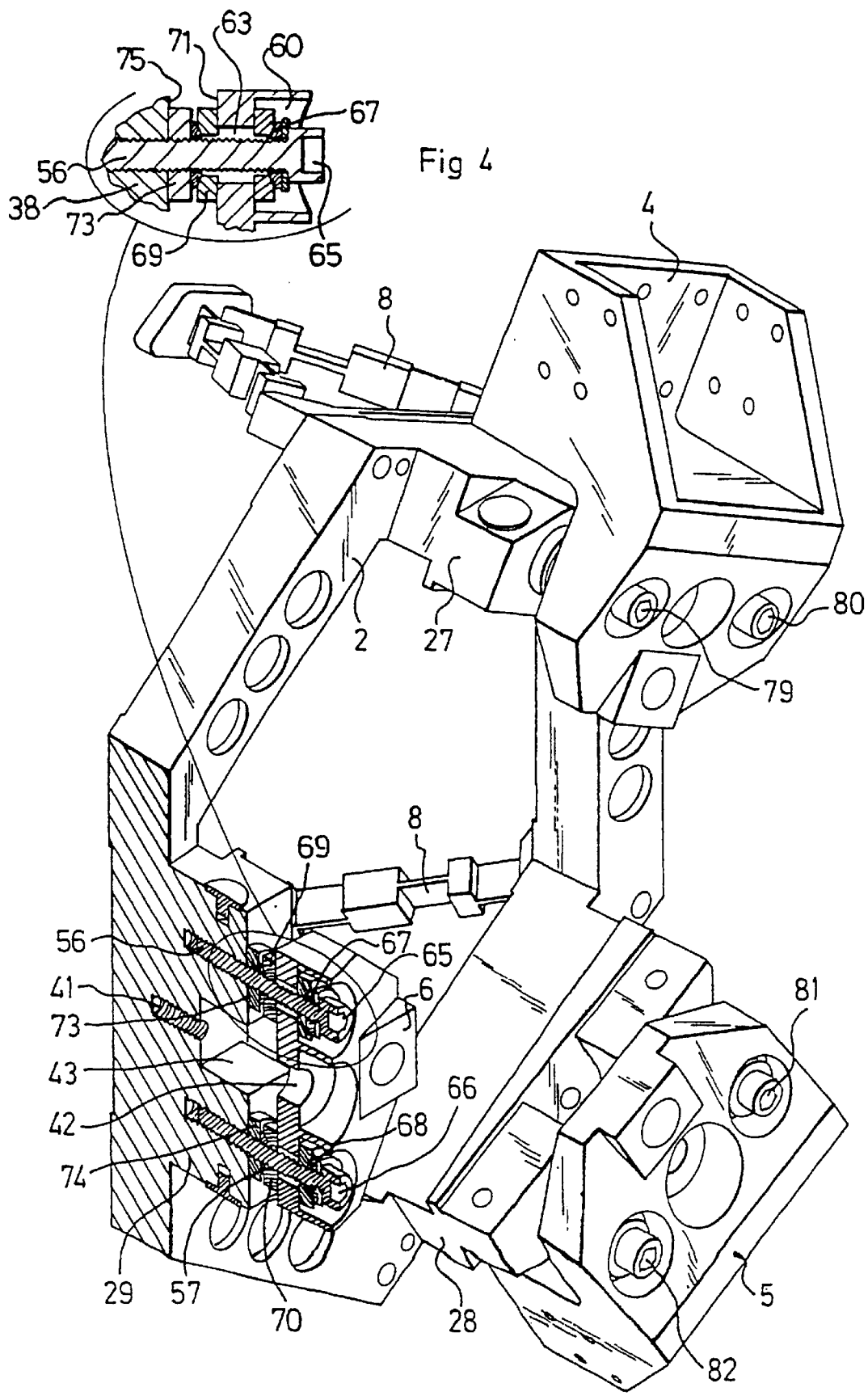
Figure 5:
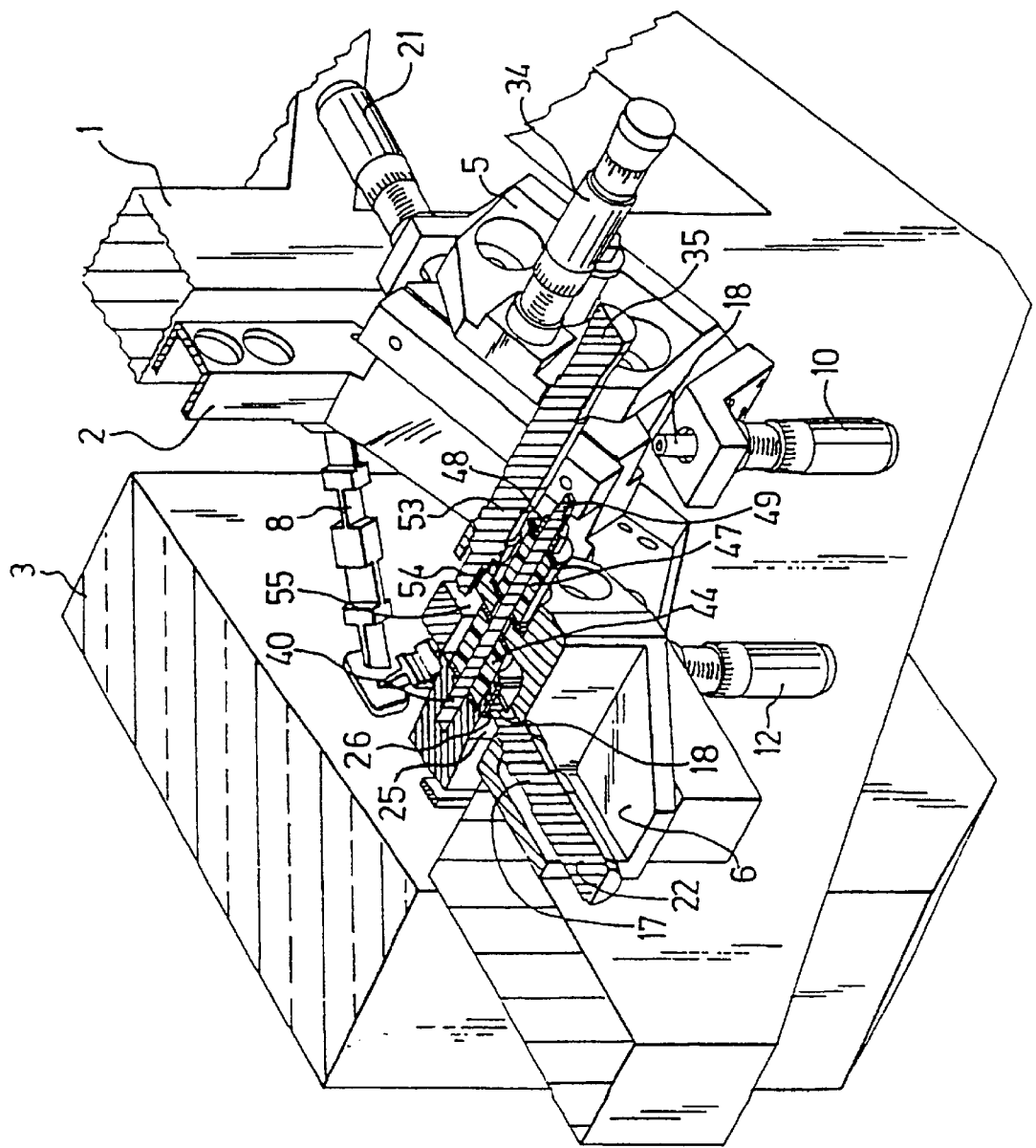
Figure 6:
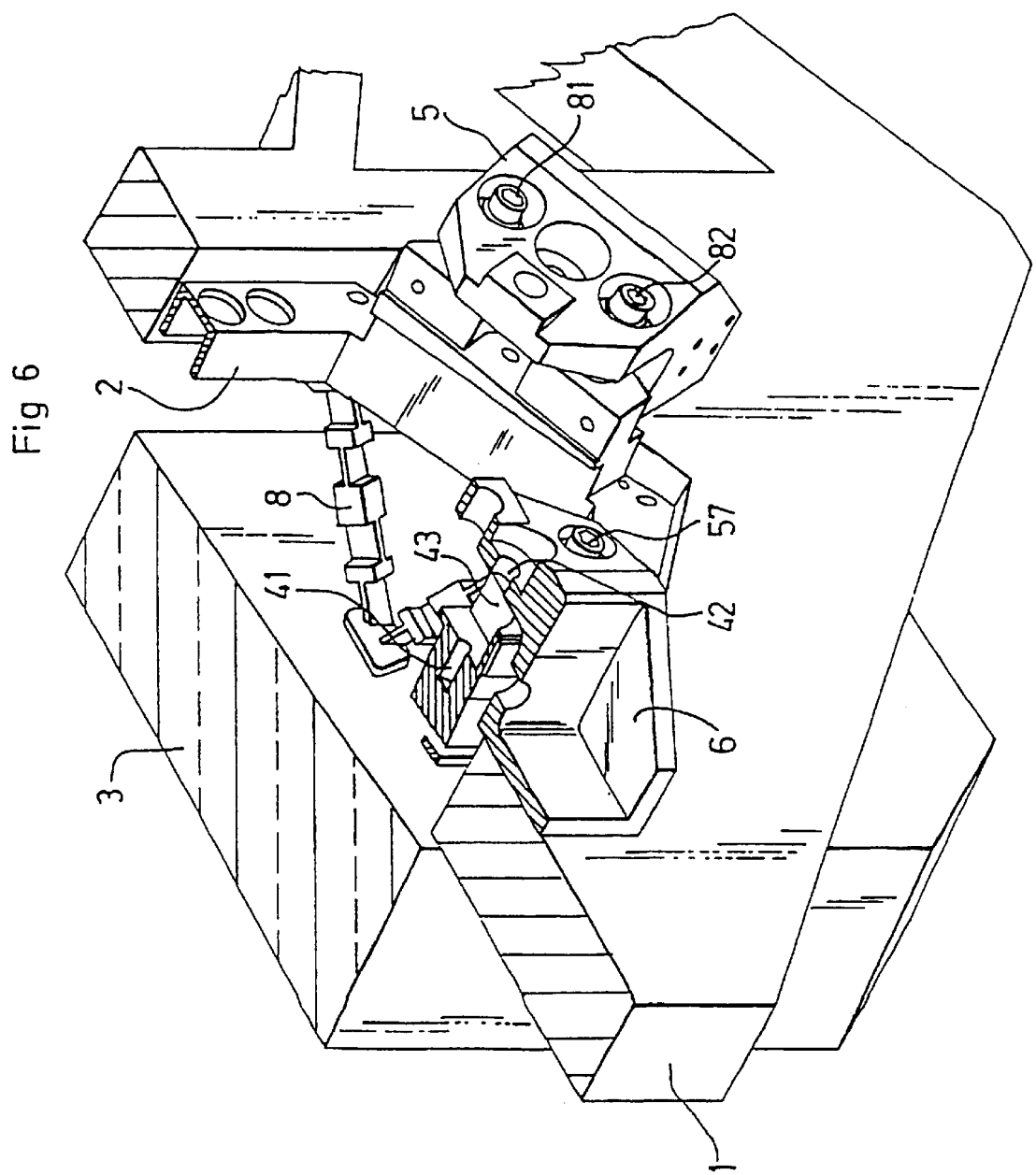

Other features, objectives and advantages of the present invention will become apparent on reading the following description which refers to the accompanying figures in which:

FIG. 1 perspective view illustrating an embodiment of a device according to the invention for the micrometric positioning of a aspherical mirror shown in the adjustment configuration, FIG. 2 is a similar view to FIG. 1, the device being shown in a flight configuration, FIG. 3 is a view in perspective and in section along the plane of the locking screws of one of the mountings, of the device of FIG. 1 in the adjustment configuration, FIG. 4 is a similar view to FIG. 3 and with a partial detailed view in section of a locking screw, the device being shown in a flight configuration, FIG. 5 is a view in perspective and in section through a plane along the second direction passing through the third means of adjustment of one of the mountings, of the device of FIG. 1 in the adjustment configuration, FIG. 6 is a similar view to FIG. 5, the device being shown in the flight configuration.

In FIG. 1, a device has been shown for the micrometric positioning with respect to a frame 1 of a support 2 of an aspherical mirror 3 forming part of a telescope with aspherical mirrors integrated into an earth observation satellite. The frame 1 is secured to the structure of the satellite. Since each of the mirrors of the telescope is mounted on a support attached to the frame 1 by a micrometric positioning device according to the invention, the mirrors are positioned with respect to each other with a very high degree of precision.

In FIG. 1, the micrometric positioning system is shown in the adjustment configuration on the ground, the principal optical axis of the mirror 3 being at least substantially horizontal.

The device according to the invention comprises three mountings 4, 5, 6 which are secured to the frame 1 and are positioned around an opening 7 provided through the frame 1 to receive the support 2. The mountings 4, 5, 6 are positioned following a relative angular distribution as close as possible to a distribution of 120° to each other about the opening 7. The mountings 4, 5, 6 are generally T-shaped, so as to have portions which extend radially projecting towards the center of the opening 7, so as to be opposite the support 2 inserted in the opening 7.

The support 2 has the general form of a rigid frame (FIGS. 3 and 4), and the mirror 3 is connected in a manner known per se to this support 2 by means of suitable fixing lugs 8 producing an isostatic assembly.

Each mounting 4, 5, 6 includes at least one micrometric stop 9, 10, 11, 12 for adjustment in translation along a first direction, which is the vertical direction in the embodiment shown, of a first facing portion 13, 14, 15, 16 of the support 2.

Each micrometric stop 9, 10, 11, 12 includes a stop body 17 carried by the mounting 4, 5, 6 and an actuating rod 18 pressing against a bearing surface 19 which is at least substantially perpendicular to the axial direction of the rod 18 (namely to the vertical direction) and which is secured to the said first portion 13, 14, 15, 16 of the support 2. Preferably, the bearing surfaces/are formed of separate parts made of a special very hard alloy (for example made of marval steel).

In the embodiment shown, preferably and according to the invention, the device includes a right hand upper mounting 4, a right hand lower mounting 5 and a left hand mounting 6 placed at middle height.

The right hand upper mounting 4 includes a vertical micrometric stop 9 adapted so as to push back the first facing portion 13 of the support 2 downwards. The right hand lower mounting 5 includes a vertical micrometric stop 10 adapted so as to push back the first facing portion 14 of the support 2 upwards. The left hand middle mounting 6 includes an upper vertical micrometric stop 11 pushing back a facing portion 15 of the support 2 downwards, and a lower vertical micrometric stop 12 pushing back a facing portion 16 of the support 2 upwards. Thus the different stops 9 to 12 are adapted to act vertically in opposite directions and therefore make isostatic adjustments possible.

The support 2 is carried in the vertical direction by the two micrometric stops 10, 12 of which the actuating rods are directed vertically upwards.

Each mounting 4, 5, 6 also includes at least one micrometric stop 20, 21, 22 for adjustment in translation along a second direction, which is the transverse horizontal direction parallel to the plane of the opening 7, of a second facing portion 24, 25 of the support 2. This second direction is orthogonal to the first direction.

These micrometric stops 20, 21, 22 are constituted in the same manner as the vertical micrometric stops 9, 10, 11, 12, and thus comprise a body 17 carried by the mounting 4, 5, 6, and a movable rod 18 of which the free end presses against a facing bearing surface 26 secured to the support 2. The bearing surface 26 extends at least substantially perpendicularly to the axis of the movable rod of the stop 20, 21, 22, and advantageously consists of a part added to the support 2 made of a very hard alloy.

The upper right hand mounting 4 includes a horizontal micrometric stop 20 pushing back the facing portion (not visible on the figures) of the support 2 horizontally to the left. The right hand lower mounting 5 includes a micrometric stop 21 pushing back the facing second portion 24 of the support 2 horizontally to the left. The left hand middle mounting 6 includes a horizontal micrometric stop 22 pushing back a facing second portion 25 of the support 2 horizontally to the right. The different stops 20 to 22 are also adapted so as to act transversely and horizontally in opposite directions, and therefore make isostatic adjustments possible. In this way, the different vertical micrometric stops 9, 10, 11, 12 and horizontal micrometric stops 20, 21, 22 form the first means 9 to 12 for adjustment in translation along the vertical direction and, respectively, the second means 20 to 22 for adjustment along the horizontal translation, making it possible to center the support 2 with respect to the three mountings 4, 5, 6 and with respect to the opening 7 of the frame 1.

The support 2 includes three extensions 27, 28, 29 extending perpendicularly to its plane, so as to face each of the mountings 4, 5, 6 in order to define the different positions of the support 2 which cooperate with the different vertical and horizontal micrometric stops 9 to 12 and 20 to 22 for centering the support 2 in the opening 7. The three extensions 27, 28, 29 are thus positioned with the same angular distribution as the mountings 4, 5, 6, i.e. at least substantially at 120° to each other on the frame forming the support 2.

Thus, the vertical micrometric stops 9, 10, 11, 12 form the first means 9 to 12 for adjusting a first portion 13 to 16 of the support 2 in translation along the first vertical direction with respect to the mounting 4, 5, 6. The transverse horizontal micrometric stops 20, 21, 22 extending parallel to the plane of the opening 7 form the second means 20 to 22 for adjusting a second portion 24, 25 of the support 2 in translation along the second direction orthogonal to the first direction, with respect to the mounting 4, 5, 6. In the configuration shown, this second direction then corresponds to the transverse horizontal direction, i.e. to the horizontal direction parallel to the plane of the opening 7.

The micrometric positioning device according to the invention additionally includes third means 30 to 35 for micrometric adjustment of a third portion 36, 37, 38 of the support 2 in translation, along a third direction which is orthogonal to the first and second directions, with respect to the mounting 4, 5, 6. This third direction is preferably the axial horizontal direction of the opening 7, i.e. the horizontal direction orthogonal to the first vertical direction and to the second transverse horizontal direction. This third direction also corresponds in general to the optical axis of sight of the telescope and/or to the principal axis of the mirror 3, and the support 2 is only slightly inclined or is not inclined at all with respect to this third direction, according to the configuration of the optical system (centred or off-axis). More particularly, it should be noted that when the support 2, in the form of a flat frame, is in its perfectly adjusted position, the extensions 27, 28, 29 define a vertical plane which is only slightly inclined or is not inclined at all with respect to the vertical plane of the opening 7 and therefore with respect to the vertical plane defined by the mountings 4, 5, 6. This inclination is in particular sufficiently small for the relative angles between the first, second and third directions, taken with reference to the frame 1, and respectively, the corresponding vertical, transverse horizontal and axial horizontal directions taken with reference to the support 2, to have values of the order of a few tens of milliradians corresponding to the permitted maximum traverses of the adjustments of the support 2 along the third direction.

The three mountings 4, 5, 6 extend overall along the same plane perpendicular to the third direction, and the first means of adjustment 9 to 12 and the second means of adjustment 20 to 22 along the first direction and along the second direction respectively, are means for centering the support 2 and the mirror 3 with respect to the mountings 4, 5, 6 and with respect to the opening 7. The three mountings 4, 5, 6 are preferably positioned at least substantially at 120° to each other about an axis at least substantially parallel to the third direction. Preferably, during adjustment, the third direction is at least substantially horizontal and the first direction is at least substantially vertical. Nevertheless, the orientation of the device during adjustment is in fact not important and other orientations are possible. In particular, as a variant, the third direction corresponding to the optical axis of the mirror may be collinear with the vertical direction during integration on the ground.

The orientation of the device according to the invention on launch with respect to direction of thrust of the rocket is also unimportant, the device being dimensioned in a tightened/locked configuration in order to withstand the take-off acceleration (30 g or more) in any direction.

The third micrometric means of adjustment 30 to 35 comprise, for each mounting 4, 5, 6, a coarse adjustment device 30, 31, 32 adapted so as to permit adjustment to a coarse precision, and a fine adjustment device 33, 34, 35, adapted to permit adjustment to medium and fine precisions.

FIGS. 3 and 5 show in section the third means of adjustment 32, 35 of the left hand middle mounting 6. Consequently, only these third means 32, 35 are described in detail, it being understood that the same components and devices are provided for the two other upper right 4 and lower right 5 mountings.

The coarse adjustment device 32 comprises a threaded rod 40 of which one end is screwed into a blind tapping 41 in the support 2. The rod 40 and the tapping 41 extend parallel to the axial horizontal direction of the support 2, i.e. substantially along the third direction, the inclination between these two directions being zero in the nominal position and small after adjustment. The rod 40 extends in the direction of the mounting 6 which it traverses through a bore 42 of which the internal diameter is greater than the external diameter of the rod 40. The third portion 38 of the support 2 facing the mounting 6 includes a housing 43 for receiving a cylinder 44 of synthetic elastic material traversed axially by the rod 40. This cylinder 44 is thus interposed between the support 2 and the mounting 6 and extends around rod 40. At least one washer 45 made of a material with a low static coefficient of friction, for example made of TEFLON or coated with NUFLON (registered tradenames), is interposed between the bottom of the housing 43 of the support 2 and a corresponding end of the cylinder 44. Similarly, at least one washer 46 made of a material with a low static coefficient of friction is interposed between the other end of the cylinder 44 and a bearing surface 52 of the mounting 6. The cylinder 44 and the washers 45, 46 have an internal diameter which corresponds to the external diameter of the rod 40. Preferably, two washers 45, 46 are provided at each end of the cylinder 44.

The rod 40 is extended beyond the bore 42 so as to be able to receive, from the other side of this bore 42 and the mounting 6, a cylinder 47 made of a synthetic elastic material similar to the cylinder 44. The rod 40 traverses all the cylinder 47 axially, and the end of this rod 40 receives a nut 48. At least one washer 50 made of a material with a low static coefficient of friction is interposed between the nut 48 and the corresponding end of the cylinder 47. Similarly, at least one washer 51 made of a material with a low static coefficient of friction is interposed between the other end of the cylinder 47 and a corresponding bearing surface, defined around the bore 42 of the mounting 6. Preferably, two washers 50, 51 are provided at each end of the cylinder 47.

In this way, the different washers 45, 46, 50, 51 facilitate and permit relative movements of the support 2 with respect to the mounting 6, along the first and second directions, under the effect of the first and second means of adjustment.

The free end of the rod 40 is adapted so as to enable it to cooperate with a tool for screwing in and unscrewing this rod 40 with respect to the tapping 41 of the support 2. For example, this free end 49 is square.

The nut 48 is screwed onto the rod 40 so as to compress the two cylinders 44, 47 axially. Each of these two cylinders 44, 47 has a length such that the cylinders are both in the compressed state in any position of adjustment of the support 2 with respect to the frame 1.

Accordingly, the two elastic cylinders 44, 47 constitute elastic return devices which exert opposing return forces on the mounting 6, i.e. from each side of the bore 42 respectively. The rod 40 and the nut 48 constitute a screw/nut system for adjusting the distance between the third portion 38 of the support 2 and the nut 48, the cylinder 47 pressing on the nut 48 via the washer or washers 50, while the cylinder 44 presses on this third portion of the support 2 via the washer or washers 51.

The stiffness of each of the cylinders 44, 47 in the axial direction (third direction) is adapted so as to enable the support 2 to be held in position with respect to the frame 1 under the effect of gravity, but so as to permit adjustments by action on the first 9 to 12 and second 20 to 22 means of adjustment and on the fine adjustment device 33 to 35 of the third means of micrometric adjustment 30 to 35 described hereinafter.

The difference between the internal diameter of the bore 42 and the external diameter of the rod 40 is adapted so as to permit relative movements and adjustments along the first and second directions.

As will be seen, this coarse adjustment device 32 has no means for measuring the distance separating the third portion 38 of the support 2 from the facing portion of the mounting 6 (which is formed of the bearing surface 52 about the bore 42 on which the cylinder 44 presses via the washer 46). Measurement during coarse adjustment is in fact carried out using micrometric measuring means formed of the fine adjustment device 35.

By tightening the nut 48 on the threaded rod 40, the two cylinders 44, 47 are compressed and the mounting 6 is brought towards the support 2 along the third axial direction. If p is the pitch of the threaded rod 40, K1 is the coefficient of axial elastic stiffness of the cylinder 47 interposed between the nut 48 and the mounting 6, and K2 is the coefficient of axial stiffness of the cylinder 44 interposed between the support 2 and the mounting 6, the coarse precision of this adjustment device 32 is equal to p×K2/(K1+K2) per turn of the nut 48, i.e. p/2 if K1=K2. This coarse precision may thus be adapted to the desired value within the limit of the possible values for K1 and K2, by a suitable choice of the ratio K1/K2 and of the pitch p of the threaded rod 40 and of the nut 48. For example, if the pitch p is equal to 0.5 mm/turn and if K1=K2, a coarse precision is obtained over a quarter of a turn of the order of 62.5 μm. The cylinders 44, 47 advantageously consist of an elastomeric material such as rubber, of which the stiffness is for example of the order of 50 N/mm. As a variant, it is possible to use compression springs in place of the cylinders 44, 47.

It should be noted that other alternative embodiments of this coarse adjustment device 30 to 32 are possible. For example, the rod 40 and the nut 48 may be replaced by a screw of which the head replaces the nut 48 and of which the free end is inserted in a tapping in the support 2 which is sufficiently long to enable this screw to be screwed in and unscrewed with a view to adjustment. In another variant, the rod 40 may pass through the support 2 which is then provided with a bore having a larger diameter instead of the tapping 41, the threaded rod being then screwed into a tapping in the mounting 6 and the tightening screw being positioned on the other side of the support 2 i.e. on the side of the mirror 3. In this case, the elastic return cylinders are placed either side of the support 2 and exert opposing return forces, not on the mounting, but on the support 2. From a kinematic point of view, this latter mounting is equivalent to the preceding one in as much as tightening the screw will again have the effect of compressing the two cylinders and of bringing the mounting 6 towards the support 2.

The fine adjustment device 35 is adapted to push back the support 2 and the mounting 6 against the elastic return cylinders 44, 47 of the coarse adjustment device 32. This fine adjustment device 35 consists of a differential micrometric stop, i.e. a micrometric stop comprising two knurled adjustment wheels with two different precisions, namely a knurled wheel for adjustment to a medium precision and a knurled wheel for adjustment to a fine precision. The fine precision is less than or equal to 1 μm so as to enable adjustment to be made along the third direction to approximately 1 micron. The average precision is for example of the order of 10 μm. The differential micrometric stop 35 comprises a body 53 carried by the mounting 6, and a rod 54 which is movable along the third direction, of which the free end comes into contact pressing on a facing bearing surface 55 of the third portion 38 of the support 2 (FIG. 5). By turning the knurled adjustment wheels of the stop 35, the rod 54 is deployed and pushes back this bearing surface 55, which has the effect of separating the support 2 from the mounting 6, and thus of decompressing the cylinder 44 while compressing the cylinder 47.

It should be noted that the three differential micrometric stops 33 to 35 push back the support 2 along the axial horizontal direction, all three in the same direction, the return in the other direction being ensured by the elastic cylinders 44, 47 of the coarse adjustment device 30 to 32. As a result of this, isostatic adjustment is also permitted along this third direction of the support 2 with respect to the frame 1.

This differential micrometric stop 35 also constitutes means making it possible to measure micrometrically the distance separating the third portion 38 of the support 2 and the facing portion of the mounting 6, and this with two distinct sensitivities, i.e. an average sensitivity of the order of 10 $\mu$m and a fine sensitivity of less than or equal to 1 $\mu$m. Since the differential micrometric stop 35 serves at the same time for the micrometric adjustment of the position of the support 2 with respect to the mounting 6 along the third direction and the micrometric measurement of the distance separating the support 2 from the mounting 6, the average and fine sensitivities correspond to average and fine precisions. It should be noted however that as a variant it would be possible to provide distinct micrometric measuring means for the fine adjustment device.

In order to measure this distance, it is sufficient to start from the adjusted position, to insert a shim with a standard thickness around the rod 54 of the stop 35 and to unscrew this stop 35 (i.e. to retract the rod 54 by acting on the knurled wheels) until the bearing surface 55 of the support 2 and the facing bearing surface 51 of the mounting 6 come into contact with the thickness shim. Knowing the thickness of this shim, it is possible to determine the initial distance between the bearing surface 55 of the support and the bearing surface 52 of the mounting 6. Moreover, since the differential micrometric stop 35 is provided with verniers, it is easy to return to this adjustment position, and this with the desired precision of 1 $\mu$m.

The micrometric positioning device according to the invention thus comprises the three coarse adjustment devices 30, 31, 32 which are all similar to the device 32 described above, and three differential micrometric stops 33, 34, 35 similar to the stop 35 described above. Accordingly, the third means 30 to 35 for micrometric adjustment along the third direction are two-stage means of adjustment, namely a coarse stage with a screw/nut system and a fine stage with a differential micrometric stop.

The different means of adjustment 9 to 12, 20 to 22 and 30 to 35 of the device according to the invention, along three orthogonal directions, constitute an isostatic linking assembly between the support 2 and the frame 1. In this way, the relative movements of the support 2 made in one direction do not influence the adjustments of the position of the support 2 in the other two orthogonal directions, and adjustments are greatly facilitated.

It should be noted that the extensions 26, 27, 28 of the support 2 define flat bearing surfaces 19, 26, 55 extending perpendicularly to the directions of thrust of the facing micrometric stops 9 to 12, 20 to 22 and 33 to 35. The situation is similar for each of the bearing surfaces of each mounting 4, 5, 6 on which the cylinders 44, 47 press, which are perpendicular to the axis of the threaded rods 40 and the tappings 41 of the coarse adjustment device 30 to 32.

Once adjustment has been made in an optimum operating position, using the means of adjustment described above, along the three directions in space and for the three mountings 4, 5, 6, i.e. with six degrees of freedom, the support 2 is locked in position with respect to the frame 1, using the means 56 to 76, 79 to 82 for locking the device which are shown in FIGS. 2, 4 and 6. The means for locking in an adjusted position are also described hereinafter solely with reference to the left hand middle mounting 6, it being understood that they are similar for the other two mountings 4, 5.

The locking means comprise two parallel screws 56, 57 of which the free threaded ends are engaged in a blind tapping 58, 59, provided along the third axial direction in the third portion 38 of the support 2. For each of the locking screws 56, 57, the mounting 6 includes a receiving housing 60, 61, and a bore 63, 64 of which the internal diameter is greater than the external diameter of the screw 56, 57, so that this screw 56, 57 can be engaged in the tapping 58, 59 whatever the adjusted position of the support 2 with respect to the mounting 6. The housings 60, 61 receive the heads 65, 66 of the screws 56, 57. For each locking screw, a pair of washers 67, 68 with contacting spherical bearing surfaces is interposed between the head 65, 66 of the screw and the bottom of the housing 60, 61 of the mounting 6, so that the locking screw 56, 57 presses on this bottom of the housing and therefore on the mounting 6 whatever the inclination which the axis of the locking screw may have with respect to this bottom of the housing, and with respect to the axis of the bore 63, 64.

From the other side of the bore 63, 64, another pair of washers 69, 70 with contacting spherical bearing surfaces is also placed around the screw 56, 57 and in contact with a bearing surface 71, 72 of the mounting 6. In addition, a washer 73, 74 is interposed between this pair of washers 69, 70 with contacting spherical bearing surfaces, and a facing bearing surface 75, 76 of the third portion 38 of the support 2. The two locking screws 56, 57 are thus associated with the mounting 6 by connecting means comprising two pairs of washers 67, 68 and 69, 70 with contacting spherical bearing surfaces, which press respectively against the bearing surfaces of the mounting 6 oriented in opposite directions. Accordingly, a washer of a first pair 67, 68, presses against the bottom of the housing 60, 61 oriented towards the head of the screw 56, 57 and a washer of a second pair 69, 70 presses against the bearing surface 71, 72 oriented towards the support 2. These bearing surfaces (bottoms of the housings 60, 61 and bearing surfaces 71, 72) are defined by flat faces perpendicular to the third axial direction around the emerging ends of the bore 63, 64 of the mounting 6. The bearing surface 71, 72 of the mounting 6 is a bearing surface pressing on the head 65, 66 of the locking screw 56, 57 via the pair of washers 67, 68.

The washer 73, 74 interposed between the pair of washers 69, 70 with contacting spherical bearing surfaces and the said bearing surface 75, 76 of the third portion 38 of the support 2, acts as a shim of which the thickness is adapted during adjustment (for example by grinding) in relation to the thickness measured between the third portion 38 of the support 2, and the facing portion of the mounting 6 by means of the differential micrometric stop 35. Accordingly, this washer 73, 74, together with the pair of washers 69, 70 with spherical bearing surfaces, entirely fills the distance separating the mounting 6 and the support 2 around the locking screw 56, 57.

When the locking screw 56, 57 is tightened, this distance is thus preserved. Moreover, the contacting surfaces of the pairs of washers with spherical bearing surfaces 67, 68 and 69, 70 with the corresponding bearing surfaces of the mounting 6, are such that they have as high a static coefficient of friction as possible, so that tightening of the locking screw 56, 57 also locks the support 2 with respect to the mounting 6 while preventing relative movements along the first and second directions.

In the embodiment shown, for each mounting 4, 5, 6, the device advantageously includes at least two locking screws 56, 57; 79, 80; 81, 82 parallel to each other and positioned either side of the coarse adjustment device 30 to 32 and as close as possible to this coarse adjustment device 30 to 32. The number of locking screws provided is adapted according to the mechanical forces which these screws must withstand in the situation of use (in particular on take-off). The coarse adjustment device 30 to 32, the fine adjustment device 33 to 35 and the two locking screws 56, 57; 79, 80; 81, 82 are positioned so as to cooperate with the axial extensions 27, 28, 29 along the third direction of the support 2 and so as to be as close as possible to each other.

By virtue of the washers with contacting spherical bearing surfaces and the difference in diameter between the bores 63, 64 and the locking screws, these locking screws 56, 57; 79, 80; 81, 82 can be screwed into the tappings 58, 59 of the support 2 with the different relative positions and orientations which can be assumed by the support 2 with respect to the mountings 4, 5, 6, taking into account the permitted ranges for the adjustment amplitudes for the different means of adjustment of the different mountings. The locking screws and their connecting means 58, 59, 67 to 70 to the support 2 and the mounting 6 are adapted so as to lock the mounting 6 and the support 2 in position, after tightening, the locking screws extending at least substantially along the third axial direction. All the locking screws are preferably oriented axially and tightened in the same direction.

As a variant (not shown) for each locking screw, the two pairs of washers with contacting spherical bearing surfaces may be replaced by a ball coupling.

In addition, the different means of adjustment have parts adapted so as to be detachable and dissociated from the frame 1 and/or the support 2 after locking in the adjusted position. In particular, the elastic cylinders 44, 47, the threaded rods 40 with their nuts 48 and their washers 45, 46, 50, 51, i.e. the entire coarse adjustment device 32 of the third means of micrometric adjustment and the different vertical, transverse horizontal and axial horizontal micrometric stops 9 to 12, 20 to 22, 33 to 35 are detachable after locking in the adjusted position and may be dissociated from the mounting 6 and from the support 2.

The bearing surface 55 of the third portion 38 of the support 2 on which the rod 54 of the differential micrometric stop 35 presses is formed of a part 77 which is detachably mounted with respect to the corresponding extension 27, 28, 29 of the support 2, and this by means of screws. This detachable part 77 is positioned so as to close the housing 43 in the form of a throat provided in the third portion 38 of the support 2 to receive the elastic cylinder 44. Accordingly, when this part 77 defining the bearing surface 55 is removed, the housing 43 is open towards the centre of the support 2 and the cylinder 44 may be extracted transversely. As a result of this, in order to demount the coarse adjustment device 32, it is sufficient to unscrew the screw 40 by acting on its square end 49, to remove the part 77 forming the bearing surface 55 and to extract the cylinder 44 through the opening in the housing 43 thus disengaged.

The micrometric stops 9 to 12 and 20 to 22 for adjustment along the first and second directions are advantageously carried by individual supports 78 fixed to each mounting by screws. By demounting the individual supports 78, the corresponding micrometric stops are simultaneously demounted. As a variant, for certain of the micrometric stops, for example for the transverse horizontal micrometric stop 22 of the mounting 6 and for the axial differential micrometric stops 33, 34, 35, the bodies of these micrometric stops are directly fixed by screwing into a tapping in the mounting. When all the locking screws 56, 57; 79, 80; 81, 82 are tightened and the different parts of the means of adjustment are demounted, the positioning device has a configuration in flight such as represented in FIGS. 2, 4, 6.

In FIG. 4, the contacting bearing surfaces 19 for the vertical micrometric stops 9 to 12 are shown, but it should be understood that these bearing surfaces could also be demounted before take-off. In FIGS. 3 and 4, the frame 1 is not shown in the interests of greater clarity, only the mountings 4, 5, 6 being shown.

It should also be noted that the cylinders made of elastomeric material 44, 47, which could not be integrated into a space system (taking into account the degassing of rubber in a vacuum), are demounted after the support 2 is locked in the adjusted position.

The different micrometric stops and the bearing surfaces 19, 26 and 55 on which they press, are made of material adapted so as to permit the adjustment and maintenance of the support 2 and of the mirror 3 during adjustment on the ground, taking into account the total mass thus suspended. Moreover, the bearing surface 55 of the movable rod of the differential micrometric stops 33, 34, 35 and the stops themselves are chosen so that they are able to move the support 2 away from the mounting against the elastic cylinder 47. All these stops and corresponding bearing surfaces are made of an extremely hard material, and are adapted so as to withstand high axial forces, in particular of the order of 50 N to 150 N, for a support 2 and a mirror 3 having a total mass which can amount to as much as 15 kg. The different micrometric stops 9 to 12, 20 to 22 and 33 to 35 are for example stops such as marketed by the MICRO-CONTROLE Company (EVRY, FRANCE).

Similarly, the different mountings 4, 5, 6 are formed of an extremely strong and rigid material so as to prevent any changes in the adjustment of the position of the mirror 3 when the locking screws 56, 57 are tightened, and then during take-off.

The device according to the invention operates in the following manner.

The support 2 is first of all placed in the opening 7 while engaging the threaded rods 40 previously fixed onto the support 2 through the bores 42 of the mountings 4, 5, 6 and after having inserted the washers 45, 46 and the cylinders 44. The mountings 4, 5, 6 are provided with micrometric adjustment stops 9 to 12, 20 to 22, 33 to 35. On the other hand, during adjustment, the locking screws are not installed.

In order to facilitate this initial centering, at least two centering bolts may be provided mounted respectively in the tappings 58, 59 designed subsequently for the locking screws. These bolts are thus supported radially in the corresponding bores 63, 64 of the mountings 4, 5, 6.

The nuts 48 of the different coarse adjustment devices, 30, 31, 32 are then tightened.

The support 2 and the mirror 3 are then centered by putting the seven vertical stops 9 to 12 and transverse horizontal stops 20 to 22 into contact with their respective bearing surfaces.

The position of the support 2 is then adjusted for tilt and focus, i.e. in inclination and in axial position with respect to the axis of the opening 7, first of all by means of the nuts 48 of the coarse adjustment devices 30 to 32 and then, to approximately one micron, by means of the differential micrometric stops 33 to 35, to an average precision and then to the fine position. These adjustments are carried out by successive iterations and optical measurements while checking the quality of the image obtained. When the optimum adjustment in position is obtained, the axial distance is measured separating the bearing surfaces 55 of the support 2 from the bearing surfaces 52 of the mountings 4, 5, 6 in the third axial direction by means of the different differential micrometric stops 33 to 35 as described above. Each of the washers 73, 74 (shims) are then selected with a thickness determined in relation to this measurement of distance, and the different locking screws 56, 57; 79, 80; 81, 82 are then put in position and tightened to the nominal tightening torque. An optical check is made once again of the quality of the image obtained. If this is not satisfactory, a new micrometric measurement is taken to evaluate the changes to be made to the washers 73, 74 (shims). The locking screws are then loosened and removed with the shim washers, the thickness of the shim washers is altered according to the preceding measurement, the locking screws are remounted and a new optical check is made. The procedure is continued with successive iterations until the image obtained after tightening the locking screws to the nominal torque is considered satisfactory. All the detachable parts are then demounted which have been used in the adjustments as indicated above.

The device according to the invention permits isostatic adjustment followed by isostatic locking of the support 2 with respect to the frame 1. An extremely fine micrometric adjustment is thus obtained of the position of the mirror 3 with respect to the frame 1 and locking of the position of the mirror 3 adjusted in this way, compatible with the accelerations to be withstood by the device during take-off (typically 30 g or more).

The device shown in the figures is applicable to the micrometric positioning of an aspherical mirror of a telescope for observing the earth from space. The invention is nevertheless equally applicable to the micrometric positioning of any other optical element in six degrees of freedom, in an optical system designed to be integrated into a space system.

Moreover, the embodiments described and shown in the figures may be the subject of many variants. In particular, other equivalent embodiments from a kinematic and mechanical point of view may be provided as well as different adjustment and locking means. For example, the micrometric stops 9 to 12, 20 to 22 and 33 to 35 may be carried by the support 2 and not by the mountings 4, 5, 6. Similarly, the coarse adjustment devices 30 to 32 may be carried fixed to the mountings 4, 5, 6 and not to the support 2. Equally, the locking screws 56, 57; 79, 80; 81, 82 may press directly on the mounting and/or be screwed into a tapping in the mounting, washers with spherical bearing surfaces or the ball coupling being provided to cooperate with the support 2 provided with a bore traversed by the locking screw. Moreover, according to the geometry of the optical element considered, the relative positions of the three mountings 4, 5, 6 may be different from those shown and described.

What is claimed is:

1. A device for the micrometric positioning, with respect to a frame (1), of a support (2) for an optical element (3) designed to be integrated into a space system, comprising three mountings (4, 5, 6) secured to the frame (1) and, for each mounting (4, 5, 6):

first means (9 to 12) of adjustment in translation along a first direction, of a first portion (13 to 15) of the support (2) with respect to the mounting (4, 5, 6), second means (20 to 22) of adjustment in translation along a second direction, at least substantially orthogonal to the first direction, of a second portion (24, 25) of the support (2) with respect to the mounting (4, 5, 6), third means (30 to 35) of micrometric adjustment in translation along a third direction, at least substantially orthogonal to the first and the second direction, of a third portion (36 to 38) of the support (2) with respect to the mounting (4, 5, 6), these third means (30 to 35) of micrometric adjustment including means (33 to 35) for the micrometric measurement of the distance separating the third portion (36 to 38) of the support (2) and a facing portion of the mounting (4, 5, 6), the different first, second and third means of adjustment (9 to 12, 20 to 22, 30 to 35) of the different mountings (4, 5, 6) being adapted so as to be able to support and hold in an isostatic manner the support (2) and the optical element (3) in place with respect to the frame (1), and to permit isostatic adjustment of the position of the support (2) with respect to the frame (1) independently with six degrees of freedom, means (56 to 76, 79 to 82) for locking the support in an adjusted position with respect to the frame (1) comprising:

at least one locking screw (56, 57, 79 to 82) associated with the support (2) and the mounting (4, 5, 6) via connecting means (58, 59, 67 to 70) adapted so as to be compatible with different relative positions and orientations which can be assumed by the support (2) with respect to the mountings (4, 5, 6), taking into account the accepted ranges for the amplitudes of adjustment for the different means of adjustment of the different mountings (4, 5, 6), the locking screw (56, 57, 79 to 82) and the connecting means being adapted so as to lock, after tightening, the mounting (4, 5, 6) and the support (2) in position with respect to each other, at least one shim (73, 74) of which the thickness is determined as a function of the distance measured between the third portion (36 to 38) of the support (2) and the facing portion of the mounting, this shim (73, 74) being placed so as to fill entirely, with the said connecting means, the distance separating the mounting (4, 5, 6) from the support (2) about the locking screw (56, 57, 79 to 82), so that the position of the support (2) with respect to the frame (1) may be adjusted on the ground independently with six degrees of freedom, and then locked with locking screws (56, 57, 79 to 82) enabling this adjusted position to be maintained during the launch of the space system and in space.

2. The device as claimed in claim 1, wherein the third means (30 to 35) of micrometric adjustment are adapted so as to permit adjustment to at least three distinct precisions, namely a coarse precision, an average precision and a fine precision.

3. The device as claimed in claim 2, wherein the fine precision is less than or equal to 1 $\mu$m.

4. The device as claimed in claim 2, wherein the said coarse and medium precisions are of the order of 100 $\mu$m and 10 $\mu$m.

5. The device as claimed in claim 2, wherein the third means (30 to 35) of micrometric adjustment include a coarse adjustment device (30 to 32) adapted so as to permit adjustment to the coarse precision and a distinct fine adjustment device (33 to 35) adapted so as to permit adjustment to medium and fine precisions.

6. The device as claimed in claim 5, wherein the coarse adjustment device (30 to 32) has no means for measuring the distance between the third portion (38) of the support (2) and the facing portion of the mounting (4, 5, 6).

7. The device as claimed in claim 5, wherein the coarse adjustment device (30 to 32) comprises:
two elastic return devices (44, 47) adapted so as to exert opposing return forces on a first part which is secured either to the mounting (4, 5, 6) or to the support (2),
a screw/nut system (40, 48) for adjusting the distance between a second part which is secured respectively either to the support (2) or to the mounting (4, 5, 6) and a complementary part (48), one (47) of the elastic return devices pressing on the said complementary part (48) while the other (44) elastic return device presses on this second part.

8. The device as claimed in claim 7, wherein the two elastic return devices (44, 47) are cylinders made of an elastic synthetic material in compression and the screw/nut system (40, 48) is adapted so that the two cylinders (44, 47) are in the compressed state in any adjustment position.

9. The device as claimed in claim 7, wherein the stiffness of each of the elastic return devices (44, 47) is adapted so as to enable the support (2) to be held in position with respect to the frame (1) under the effect of gravity but so as to permit adjustments by action on the first and second means of adjustment and on the fine adjustment device (33 to 35) of the third micrometric means of adjustment.

10. The device as claimed in claim 7, wherein the screw/nut system (40, 48) comprises a rod (40) passing through a bore (42) provided through the said first part, and this bore (42) has an internal diameter greater than the external diameter of the rod (40) so as to permit relative movements and adjustments along the said first and second directions.

11. The device as claimed in claim 7, wherein washers (45, 46, 50, 51) made of a material with a low static coefficient of friction are interposed from each side of the bore (42), between each end of the elastic return devices (44, 47), and an opposite supporting face of the first part, so as to facilitate relative movements along the first and second directions under the effect of the first and second means of adjustment.

12. The device as claimed in claim 7, wherein the fine adjustment device (30 to 32) is adapted so as to push back the said first and second parts against the elastic return devices (44, 47) of the coarse adjustment device (30 to 32).

13. The device as claimed in claim 7, wherein the elastic return devices (44, 47) and the screw/nut system (40, 48) of the coarse adjustment device (30 to 32) of the third means of micrometric adjustment (30 to 35) and the different micrometric stops (9 to 12, 20 to 22, 33 to 35) are mounted so as to be detachable after locking in the adjusted position.

14. The device as claimed in claim 5, wherein the fine adjustment device (33 to 35) includes means for the micrometric measurement of the distance separating the third portion of the support and the facing portion of the mounting, with two distinct sensitivities, namely a medium sensitivity and a fine sensitivity.

15. The device as claimed in claim 14, wherein the average and fine sensitivities correspond to the said medium and fine precisions.

16. The device as claimed in claim 5, wherein the fine adjustment device (33 to 35) includes a body (53) carried by the mounting (4, 5, 6) and a rod (54) which can move along the third direction and of which the free end comes into contact pressing on the bearing surface (55) of the third portion (36, 38) of the support (2).

17. The device as claimed in claim 5, wherein the fine adjustment device (33 to 35) consists of a differential micrometric stop.

18. The device as claimed in claim 1, wherein each locking screw (56, 57, 79 to 82) extends at least substantially along the said third direction.

19. The device as claimed in claim 1, wherein the connecting means comprise, for each locking screw (56, 57, 79 to 82), two pairs of washers (67 to 70) with spherical contacting bearing surfaces, pressing against bearing surfaces (60, 61, 71, 72) oriented in opposite directions so as to enable the locking screw (56, 57, 79 to 82) to be tightened with different orientations relative to the support (2) and to the mounting (4, 5, 6).

20. The device as claimed in claim 1, wherein the connecting means comprise, for each locking screw (56, 57, 79 to 82), a ball coupling.

21. The device as claimed in claim 1, wherein, for each locking screw (56, 57, 79 to 82), the support (2) includes a tapping (58, 59) for receiving an end of the locking screw, and the mounting (4, 5, 6) includes a bearing surface (60, 61) for supporting a head (65, 66) of the locking screw, and a bore (63, 64) traversed by the locking screw, and wherein the internal diameter of the bore (63, 64) is greater than the external diameter of the locking screw by an amount sufficient to enable the locking screw to be tightened in the tapping (58, 59) in any position of the support (2) with respect to the frame (1) adjusted along the first and second directions.

22. The device as claimed in claim 1, wherein the connecting means include a pair of washers (67, 68) with spherical contacting bearing surfaces interposed between the head (65, 66) of the locking screw (56, 57, 79 to 82) and the bearing surface (60, 61) of the mounting (4, 5, 6), and a pair of washers (69, 70) with spherical contacting bearing surfaces placed around the locking screw between the mounting (4, 5, 6) and the support (2).

23. The device as claimed in claim 22, wherein a pair of washers (69, 70) with spherical contacting bearing surfaces come into contact with a bearing surface (71, 72) of the mounting (4, 5, 6) oriented towards the support (2).

24. The device as claimed in claim 23, wherein the shim (73, 74) is a washer interposed between this pair of washers (69, 70) with spherical contacting bearing surfaces, which comes into contact with a bearing surface (71, 72) of the mounting and a bearing surface (75, 76) of the third portion (36 to 38) of the support (2).

25. The device as claimed in claim 1, wherein the first means of adjustment (9 to 12) and/or the second means of adjustment (20 to 22) include a micrometric stop carried by the mounting (4, 5, 6) or by the support (2), this micrometric stop having a rod (18) of which the free end comes into contact with a facing bearing surface (19, 26) of the support (2) or of the mounting (4, 5, 6) respectively.

26. The device as claimed in claim 1, wherein the three mountings (4, 5, 6) extend overall in the same plane at least substantially perpendicular to the said third direction, the means of adjustment along the first and second directions being means for centering the optical element (3) with respect to the mountings (4, 5, 6).

27. The device as claimed in claim 1, wherein the different means of adjustment (9 to 12, 20 to 22, 30 to 35) have parts adapted so as to be detachable and dissociated from the frame (1) and/or the support (2) after locking in the adjusted position.

28. The device as claimed in claim 1, wherein the means of locking (56 to 76, 79 to 82) are dimensioned so as to be able to withstand a maximum acceleration of between 15 g and 60 g in any direction without the adjustment changing.

29. An application of a device as claimed in claim 1, for the micrometric positioning of an aspherical mirror (3) of a telescope with three mirrors for observing earth from space.

* * * * *